Patented Dec. 8, 1931

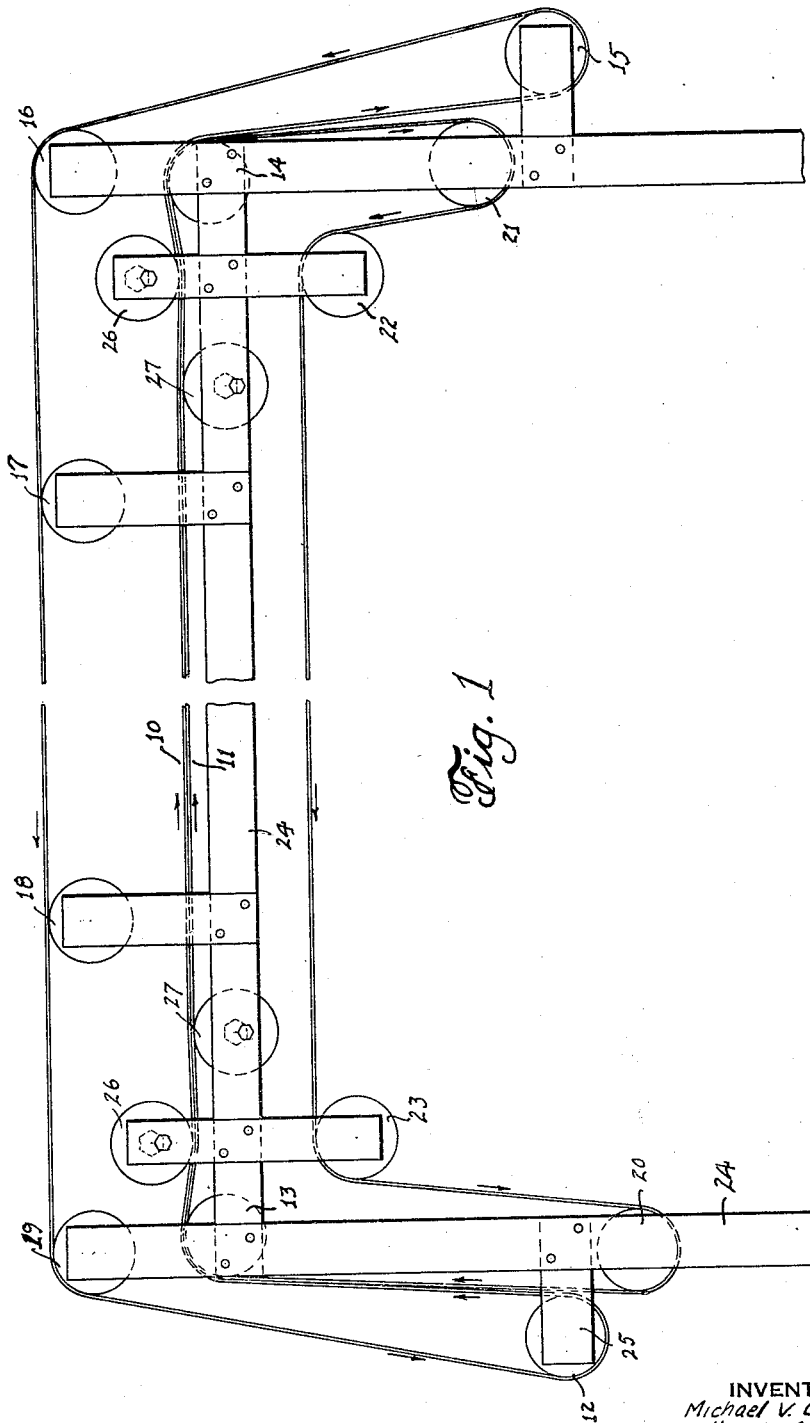

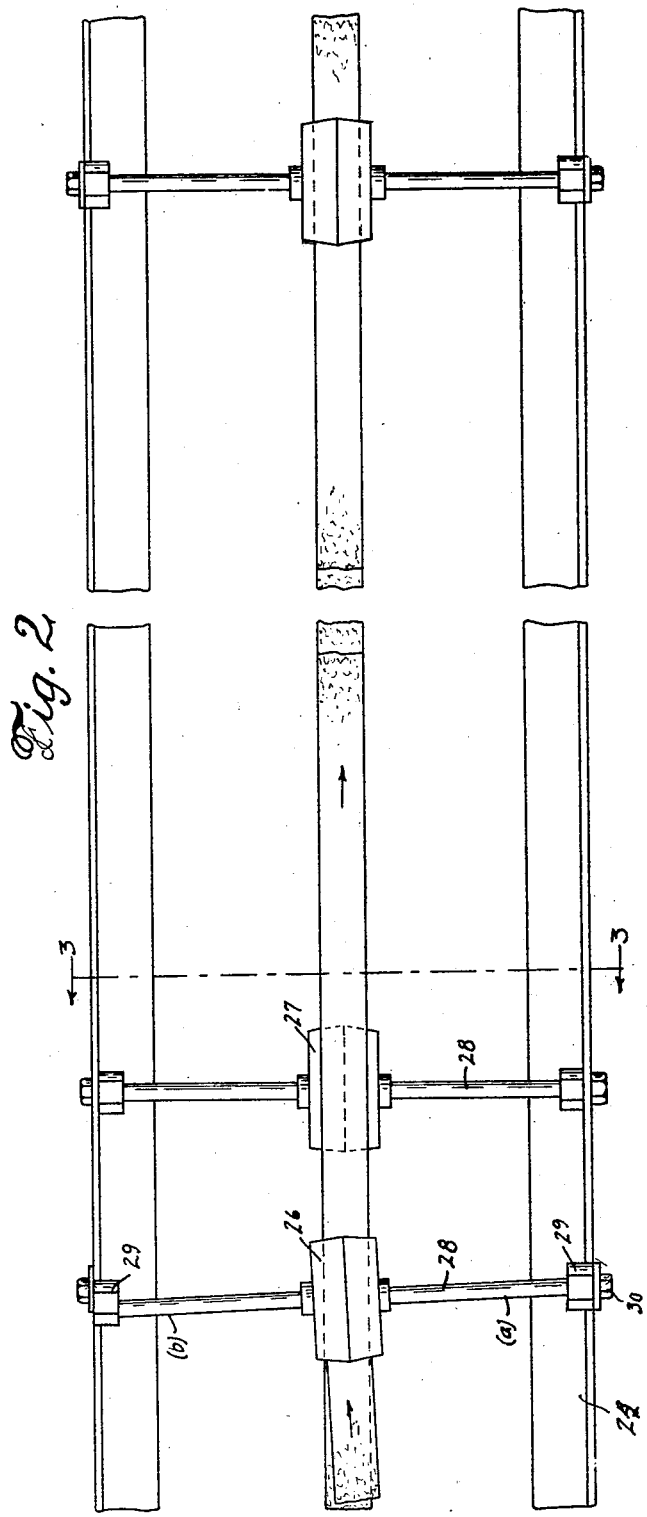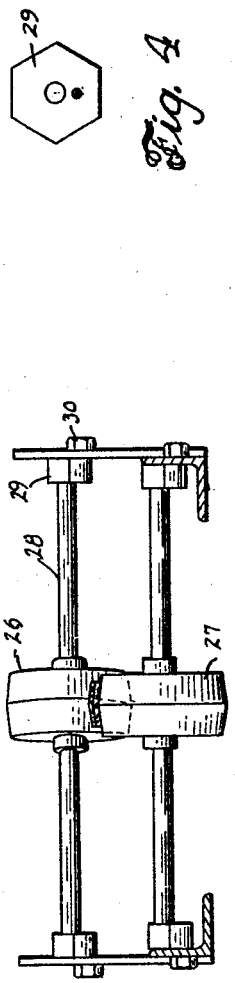

1,835,996

UNITED STATES PATENT OFFICE

MICHAEL V. CREEDON, OF WESTFIELD, NEW JERSEY, AND WILLIAM V. McGUINNESS, OF FLUSHING, NEW YORK, ASSIGNORS TO THE WESTERN UNION TELEGRAPH COMPANY, OF NEW YORK, N. Y., A CORPORATION OF NEW YORK

STRAP CONVEYER ALIGNING MECHANISM

Application filed November 12, 1929. Serial No. 406,675.

This invention relates to a conveyer system and more particularly to a conveyer employing endless straps or belts for the transportation of flat articles, such as telegrams, letters and the like, in which such articles are carried between two straps traveling in the same direction.

Such strap conveyers comprise two separate endless straps, which have an operating or working run and a return run. The operating runs are in frictional contact with each other, whereby the articles to be conveyed are gripped therebetween, one strap preferably being driven by the other.

On horizontal runs of such double strap conveyers there is a tendency for the top belt to run off of the bottom belt due to the fact that the top belt is driven by the frictional engagement with the bottom belt. Accordingly it is one of the objects of the present invention to provide means for causing the two belts to ride in proper alignment.

Other objects and advantages will hereinafter appear.

In accordance with the invention, aligning rollers are provided at intervals along the horizontal runs of the conveyer to force the top belt to run in line with the bottom or driving belt. The aligning rollers are crowned and mounted on eccentric bearings so that the crown of the rollers may be shifted relative to the direction of misalignment of the belt. Due to the fact that the belts tend to follow the crown of the aligning rollers, the tendency of the top belt to run off of the bottom belt may be compensated for by varying the relation of the crown of the aligning rollers with respect to the direction of travel of the belt.

With light straps, such as employed for transporting telegrams, letters and the like, a correction for alignment is preferably made about every twenty-five feet.

In order that the invention may be more fully understood reference will be had to the accompanying drawings in which;

Figure 1 is an elevational view of a section of a strap conveyer system, having the present invention applied thereto;

Figure 2 is a plan view of a portion of a horizontal run of the conveyer provided with aligning rollers.

Figure 3 is a sectional view on the line 3—3 of Figure 2 and

Figure 4 is a view of the eccentric nut in which the aligning roller shafts are mounted.

In Figure 1 is shown a conveyer system composed of two endless straps 10 and 11, having their operating runs in contact. Strap 10 passes around a series of rollers 12, 13, 14, 15, 16, 17, 18 and 19, in the direction indicated by the arrows. Strap 11 passes around a series of rollers 20, 13, 14, 21, 22 and 23 in the direction indicated. The operating run of the strap 10 rests upon and is driven by frictional engagement with the operating run of the lower strap 11. The rollers 12 to 23 are mounted upon shafts bearing in the frame 24 of the conveyor or in brackets 25 secured to the frame.

The articles to be conveyed are introduced into the conveyer between the contacting straps adjacent roller 20 and are delivered from the opposite end of the system. At the delivery end of the system the rollers 21 and 15 may be spaced apart sufficiently to cause the contacting straps to diverge and thereby to release the articles being conveyed so that they may fall freely from the conveyer.

It will be understood that the conveyer section shown in Figure 1 may be associated with other sections of a strap conveyer or with a conveyer of a different form, such as a wide belt conveyer in which the articles are carried in a horizontal position on the conveyer belt or a V-trough conveyer in which they are transported in a substantially vertical position. In a copending application of B. Beardsley et al., filed November 12, 1929, Serial No. 406,655, entitled Strap conveyer system, there is disclosed an arrangement for transferring telegrams or similar articles from one strap conveyer section to another.

At intervals along the horizontal run of the strap conveyer, aligning rollers 26 and 27 are disposed above and below the contacting straps 10 and 11 respectively. The aligning rollers 26 and 27 are crowned as shown and are mounted upon shafts 28 bearing in eccentric nuts 29, secured to one of the brackets 25 or to the frame 24. The shafts 28 may be shifted on their eccentric bearing by loosening the clamping nuts 30, to change the axis of the crown of the aligning rollers relative to the direction of misalignment of the straps. The strap contacting with the aligning roller, tends to follow the crown thereof and thus moves across the other strap the desired distance to effect a proper alignment thereof.

Thus for instance assuming the upper strap to have become deflected to one side of the lower strap as shown at the left hand end of Figure 2, it will be evident that by shifting one end (a) of the shaft 28 of aligning roller 26 forward or shifting the other end (b) thereof in the opposite direction or shifting both ends oppositely, so as to move the aligning roller so that its crown extends in the direction along which it is desired to return the upper strap, that the upper strap will follow the portion of the crown with which it contacts and thus move back across the lower belt in the opposite direction from the original deflection.

A correction for alignment having once been made does not need to be changed.

It is obvious that other arrangements of the aligning rollers may be employed and other mounting and adjusting means provided without departing from the invention and all such changes are contemplated as come within the scope of the appended claims.

What is claimed is:

1. A conveyer system for transporting sheet material comprising two conveyer straps arranged to travel in contact with each other and adapted to grip said sheet material therebetween, means for maintaining said straps in alignment with each other, comprising an aligning roller in contact with one of said straps, said roller being crowned, a shaft for said roller and a separate adjustable eccentric mounting for each end of said shaft whereby the position of said crown may be varied with respect to the direction of travel of the strap.

2. A conveyer system for transporting sheet material comprising two conveyer straps arranged to travel in contact with each other and adapted to grip said sheet material therebetween, means for maintaining said straps in alignment with each other, comprising a plurality of aligning rollers disposed along said contacting straps in contact with opposite sides thereof, said rollers being crowned, shafts for said rollers and means for adjusting said shafts whereby the position of the crown may be varied with respect to the direction of travel of the straps.

3. In a belt conveyer system having two conveyer belts in frictional contact over a substantially horizontal run, whereby one belt is driven by the other, means for overcoming the tendency of one belt to run off of the other, comprising aligning rollers disposed in contact with each of said straps, said rollers having crowned surfaces and means for adjusting said rollers to vary the position of said crown with respect to the belts to direct one belt across the other in opposition to the tendency of such belt to run off of the other belt.

4. A conveyer system comprising two separate endless belts having substantially horizontal operating runs in frictional contact, whereby one of said belts may be driven by the other, supporting and guiding rollers for said belts and aligning rollers in contact with said belts at intervals along their operating runs, said aligning rollers having crowned surfaces, and means for adjusting each of said aligning rollers relative to the belt in contact therewith, whereby said belt tends to travel across the other belt to overcome the tendency of said belt to ride off of the other belt.

5. A conveyer comprising two separate endless belts, having substantially horizontal operating runs in frictional contact, whereby one of said belts may be driven by the other, supporting and guiding rollers for said belts and aligning rollers disposed at intervals along the operating run of said conveyer above and below said contacting belts, said aligning rollers having crowned surfaces disposed relative to said belts so as to overcome the tendency of one belt to ride off of the other belt.

6. In a belt conveyer system, a conveyer element, a traveling belt adapted to run in frictional contact with said conveyer element for conveying sheet material between said belt and conveyer element, said belt being subject to lateral deviations from a desired normalcy, and means for compensating for said deviation comprising a roller arranged to engage the back of said belt and having its axis disposed at an angle such that the roller will apply a corrective regulation to the belt.

7. In a belt conveyer system, a conveyer element, a traveling belt adapted to run in frictional contact with said conveyer element for conveying sheet material between said belt and conveyer element, said belt being subject to lateral deviations from a desired normalcy, and means for compensating for said deviation comprising a crowned roller arranged to engage the back of said belt, and means for adjusting the axis of said roller whereby the roller will apply a corrective regulation to the belt.

In testimony whereof we affix our signatures.

MICHAEL V. CREEDON.
WILLIAM V. McGUINNESS.